US007649190B2

(12) United States Patent
Alzner et al.

(10) Patent No.: US 7,649,190 B2
(45) Date of Patent: Jan. 19, 2010

(54) PORTABLE OPTO-ELECTRO-MECHANICAL SCANNING ASSEMBLY FOR PHOTOSTIMULABLE PHOSPHOR IMAGING PLATES

(75) Inventors: Edgar Alzner, Garden City, NY (US); Yehuda Rosenstock, Freeport, NY (US); Steven Zamprelli, Bardonia, NY (US); Thomas Lloyd, New Hyde Park, NY (US)

(73) Assignee: Air Techniques, Inc.

( * ) Notice: Subject to any disclaimer, the term of this patent is extended or adjusted under 35 U.S.C. 154(b) by 0 days.

(21) Appl. No.: 12/148,231

(22) Filed: Apr. 17, 2008

(65) Prior Publication Data

US 2008/0258087 A1      Oct. 23, 2008

Related U.S. Application Data

(60) Provisional application No. 60/925,138, filed on Apr. 19, 2007.

(51) Int. Cl.
*G01T 1/105* (2006.01)
(52) U.S. Cl. .................................. 250/585
(58) Field of Classification Search ............. 250/584, 250/585
See application file for complete search history.

(56) References Cited

U.S. PATENT DOCUMENTS

| 2002/0148988 | A1* | 10/2002 | Thoms | 250/585 |
| 2003/0202636 | A1* | 10/2003 | Thoms | 378/184 |
| 2005/0230648 | A1* | 10/2005 | Koren | 250/585 |
| 2006/0091338 | A1* | 5/2006 | Koren | 250/585 |
| 2006/0131523 | A1* | 6/2006 | Rosenstock | 250/584 |
| 2006/0262370 | A1* | 11/2006 | Alzner | 359/196 |

* cited by examiner

*Primary Examiner*—David P Porta
*Assistant Examiner*—Mark R Gaworecki
(74) *Attorney, Agent, or Firm*—Clifford G. Frayne; Louis E. Marn

(57) ABSTRACT

An apparatus and process for evaluating an image-wise exposed storage film positioned about a cylindrically-shaped member and linearly passed by a slot for interrogation by a laser light beam wherein a processing assembly (laser beam and pentraprism) is co-axially disposed within a processing chamber formed by the cylindrically-shaped member effecting a size reduction of the unit and increased clarity of the resultant image, and wherein the processing assembly includes a plate member disposed for rotation in a plane perpendicular to the axis of the processing chamber and having a pentaprism and a luminescence light sensor positioned proximate a contact point of the interrogating light beam with the storage film and further including converter electronics wherein after interrogation, the image scanned is digitally archived in a central processing unit.

11 Claims, 3 Drawing Sheets

PORTABLE OPTO-ELECTRO-MECHANICAL SCANNING ASSEMBLY FOR PHOTOSTIMULABLE PHOSPHOR IMAGING PLATES

RELATED APPLICATIONS

Applicant claims the benefit of provisional application Ser. No. 60/925,138, filed Apr. 19, 2007.

BACKGROUND OF THE INVENTION

1. Field of the Invention

The present invention relates to radiographic imaging, and more particularly to an opto-electro-mechanical scanning assembly for retrieving information from imaged photostimulable phosphor imaging plates, the scanner being portable and having an enhanced arrangement of scanning elements to significantly enhance the clarity of the scanned image.

2. Description of the Prior Art

Traditional x-ray imaging systems using silver-based films are being replaced by radiographic imaging systems using photostimulable phosphor imaging films or storage substrates, thereby eliminating the need for physical storage of the imaged film since digital retrieval of the image information includes input and computer storage permitting viewing of such information on a CRT tube assembly or the equivalent thereof. Additionally, such computer storage imaging information permits facile electronic transmission to any predetermined location obviating the physical transfer of imaged film. Such radiographic imaging further permits the erasure of the image from the photostimulable phosphor imaging film or storage substrate, and the subsequent reuse thereof.

In U.S. Pat. No. 5,874,744 to Goodman, et al., assigned to the same assignee as the present invention, herein incorporated by reference, there is disclosed a process and apparatus for processing radiographic information from an anisotropic storage phosphor screen including an opto-electro-mechanical assembly to achieve faster scan of an interrogating beam and including detector and computer assembly.

In U.S. Pat. No. 6,599,004 to Thoms, there is disclosed an apparatus for reading flexible storage films wherein the flexible storage film having image-wise projected information is positioned on a cylindrically-shaped surface and is caused to be linearly moved there over by transport assemblies while being interrogated or scanned via a slot by a light beam generated in a helical line in a continuous manner from a point disposed at the axis of the cylindrically-shaped surface thereby generating luminescence detected by one or more photomultiplier tubes.

The output signal of the photomultiplier is recorded together with the output signals of the position encoder, thereby obtaining a digital electronic image of the x-ray image previously formed on the storage film in the form of exited metastable color centers of the phosphor particles. Such image is then further processed electronically in view of changing the scale of reproduction, emphasizing details, improving the signal/noise ratio, etc. The resulting image may be put into an archive in its original and/or digitally processed form requiring very little space.

Photostimulable phosphor imagining plate scanners of the type thus described are used in dental operatories, medical offices, and veterinary clinics. In normal use, due to the size of the scanner, it is typically positioned centralized within the dental, medical or veterinary clinic for the processing of imaged photostimulable phosphor imaging plates. There has been a need for a truly portable photostimulable phosphor imaging plate scanner of a reduced size, but which does not compromise the quality of the digitized image. Such portable scanners would have a use as a chair side unit in dental or medical offices, or a truly portable unit for veterinary use when attending to animals in their natural locale, and not in the veterinary operatory. Portable units of the type described would also have application in non-destructive testing and industrial X-ray situations wherein the portability of the unit allows its transport to locations previously unavailable or hostile to scanner use.

Applicant's opto-electro-mechanical scanning assembly of the present invention provides this portability need by not only reducing the size and number of elements within the scanner, but by also incorporating novel and unique design arrangements of those elements in order to provide for a portable unit that does not compromise the digitized image. Moreover, certain of the novel and unique design arrangements when applied to larger non-portable scanners improve the function and operation of such scanners and the clarity of their digital images.

OBJECTS OF THE INVENTION

An object of the present invention is to provide an improved apparatus and process for interrogating and interpreting an image on a reusable storage film moving past an accessible slot of an interrogating light beam, wherein the improved apparatus has a reduced size and enhanced arrangement of the internal elements for portability and increased clarity of the scanned image.

Another object of the present invention is to provide for an improved apparatus and process for interrogating and interpreting an image on a reusable storage film moving past an accessible slot of an interrogating light beam wherein the light beam comprises a polarized laser beam that enters the inlet facet of the rotating pentaprism on an axis of the laser beam that is parallel to the axis of the detecting device, such as a photomultiplier tube or the like, and the axis of the rotating pentaprism Another object of the present invention is to provide for an improved apparatus and process for interrogating and interpreting an image on a reusable storage film moving past an accessible slot of an interrogating light beam wherein the light beam is a laser beam oriented on an axis outside of the optical cavity and adjacent the photomultiplier tube and filter thereby providing no obstruction to the luminescence or the detecting and reading thereof.

Another object of the present invention is to provide for an improved apparatus and process for interrogating and interpreting an image on a reusable storage film moving past an accessible slot of an interrogating light beam wherein the embodiment of the aligned laser beam, detector and prism relocates the laser tube so that the laser tube does not cast a shadow within the stimulated phosphor plate signal light onto the detector which results in an intensified signal strength by a factor on the order of three.

Another object of the present invention is to provide for an improved apparatus and process for interrogating and interpreting an image on a reusable storage film moving past an accessible slot of an interrogating light beam wherein the light beam is a laser beam emanating from a laser tube being aligned with the rotating pentaprism axis requires no directional mirror that has inherent transmission losses, thereby maintaining the full energy of the laser beam and not affecting any polarization of the beam.

A still further object of the present invention is to provide for an improved apparatus and process for interrogating and interpreting an image on a reusable storage film moving past an accessible slot of an interrogating light beam wherein the vertical orientation of the laser tube allows for additional photomultiplier tubes.

A still further object of the present invention is to provide for an improved apparatus and process for interrogating and interpreting an image on a reusable storage film moving past an accessible slot of an interrogating light beam wherein the use of a single photomultiplier tube allows for the reduction in size of the device by reducing the scanning width to half, thereby, making the device capable of being portable.

A still further object of the present invention is to provide for an improved apparatus and process for interrogating and interpreting an image on a reusable storage film moving past an accessible slot of an interrogating light beam wherein the phosphor plate inlets and outlets can be configured to allow imaging plates of appropriate width but of any length to be scanned and interrogated, which can be made facile by orienting the axis of the scanner horizontally instead of vertically.

SUMMARY OF THE INVENTION

These and other objects of the present invention are achieved by an apparatus and process for evaluating an image-wise exposed storage film positioned about a cylindrically-shaped member and linearly passed by a slot for interrogation by a laser light beam wherein a processing assembly (laser beam and pentaprism) is co-axially vertically disposed within a processing chamber formed by the cylindrically-shaped member effecting a size reduction of the unit and increased clarity of the resultant image, and wherein the processing assembly includes a plate member disposed for rotation in a plane perpendicular to the axis of the processing chamber and having a pentaprism and a luminescence light sensor positioned proximate a contact point of the interrogating light beam with the storage film and further including converter electronics wherein after interrogation, the image scanned is digitally archived in a central processing unit.

BRIEF DESCRIPTION OF THE DRAWINGS

Further objects and advantages of the present invention will become more readily apparent by reference to the following detailed description thereof when taken with the accompanying drawings wherein like numerals designate like parts throughout and wherein.

DETAILED DESCRIPTION OF THE INVENTION

The object of this invention is to reduce the size of the opto-electro-mechanical scanning assembly to increase its portability. In accomplishing this task, the rearrangement of certain scanning elements has yielded unexpected benefits which results in greater clarity of the scanned image which rearrangement can benefit larger non-portable scanners.

Due to the fact that the new smaller assembly is intended to be dedicated for portable or chair side needs, and not to be used in a centralized location, it needs fewer intraoral inlet slots and can therefore me made with fewer belt tracks for transport of the photostimulable phosphor imaging plates, and in other non-dental applications the portability is desirable and becomes particularly advantageous.

Figure 1:
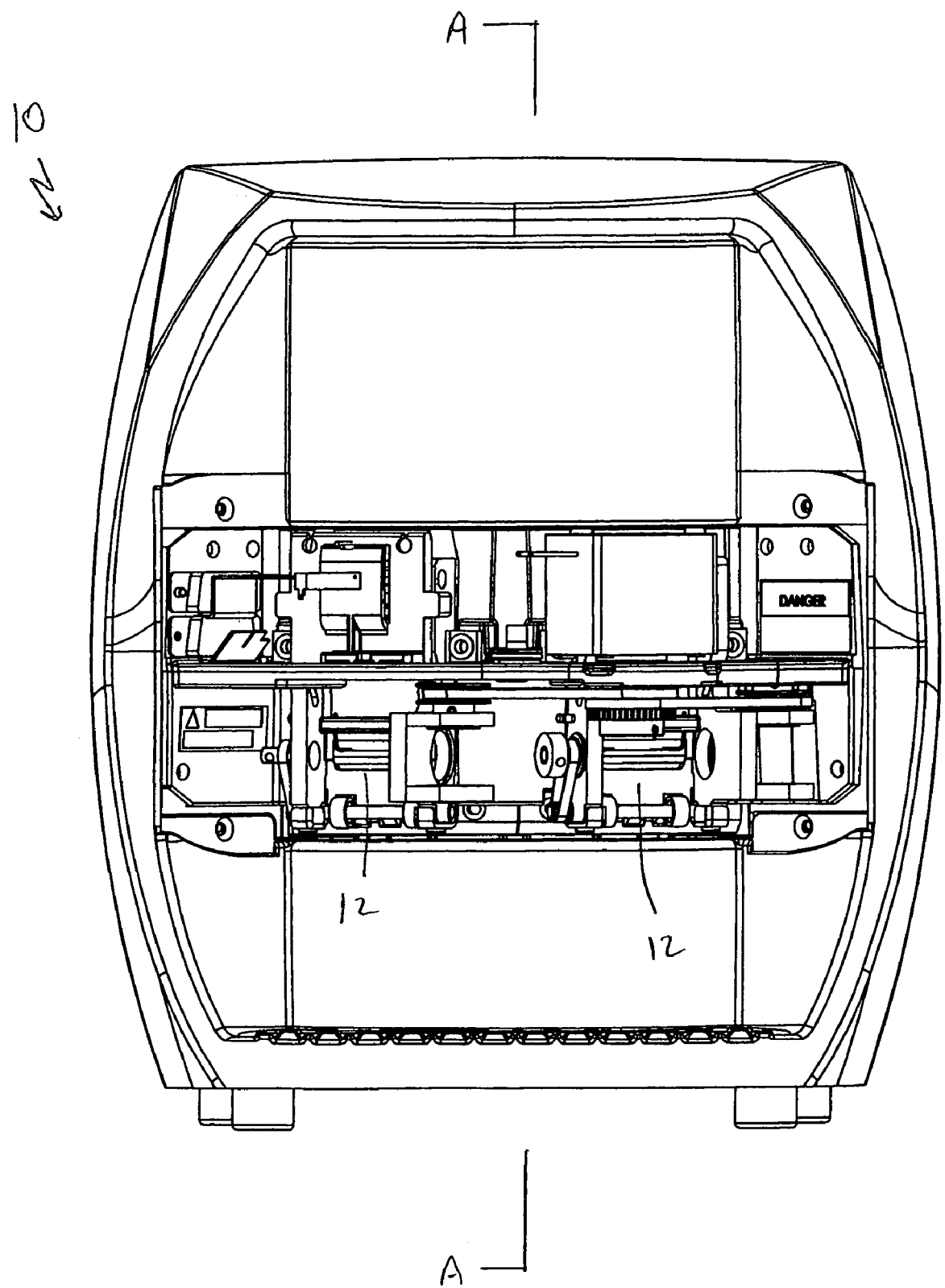
FIG. 1 is a front view of the scanner and transport mechanism of the present invention with its covering panel removed.
Figure 2:
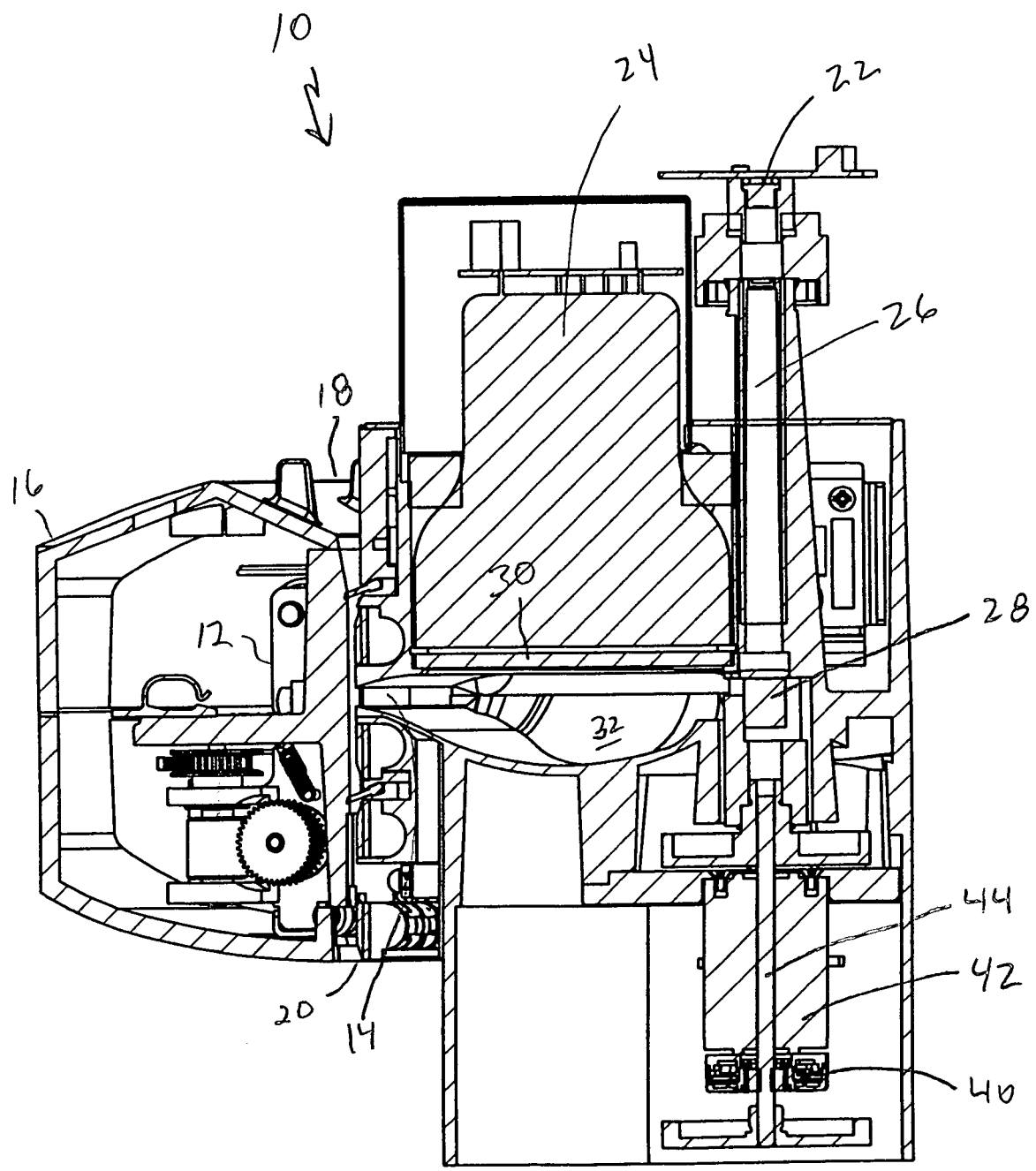
FIG. 2 is a cross-sectional interior view of the optical cavity and transport mechanism of the scanner of the present invention along axis A-A of FIG. 1.

FIG. 1 is a front view of the portable opto-electro-mechanical scanning assembly of the present invention with the transport arch cover removed illustrating the transport mechanism, and FIG. 2 is a cross section along axis A-A of FIG. 1 illustrating the scanning mechanism.

Even the smallest of centralized location scanners are considered too large for portable or chair side use. These scanners in their smallest configurations are typically in the approximate dimensional range of 15 inches wide, 15 inches high, and 15 inches deep, plus/minus. The size reduction achieved by the present portable scanner 10 reduces the size of all three dimensions to about 10 inches, plus/minus in each direction, thereby reducing the volume by more than a factor of 3.

Figure 3:
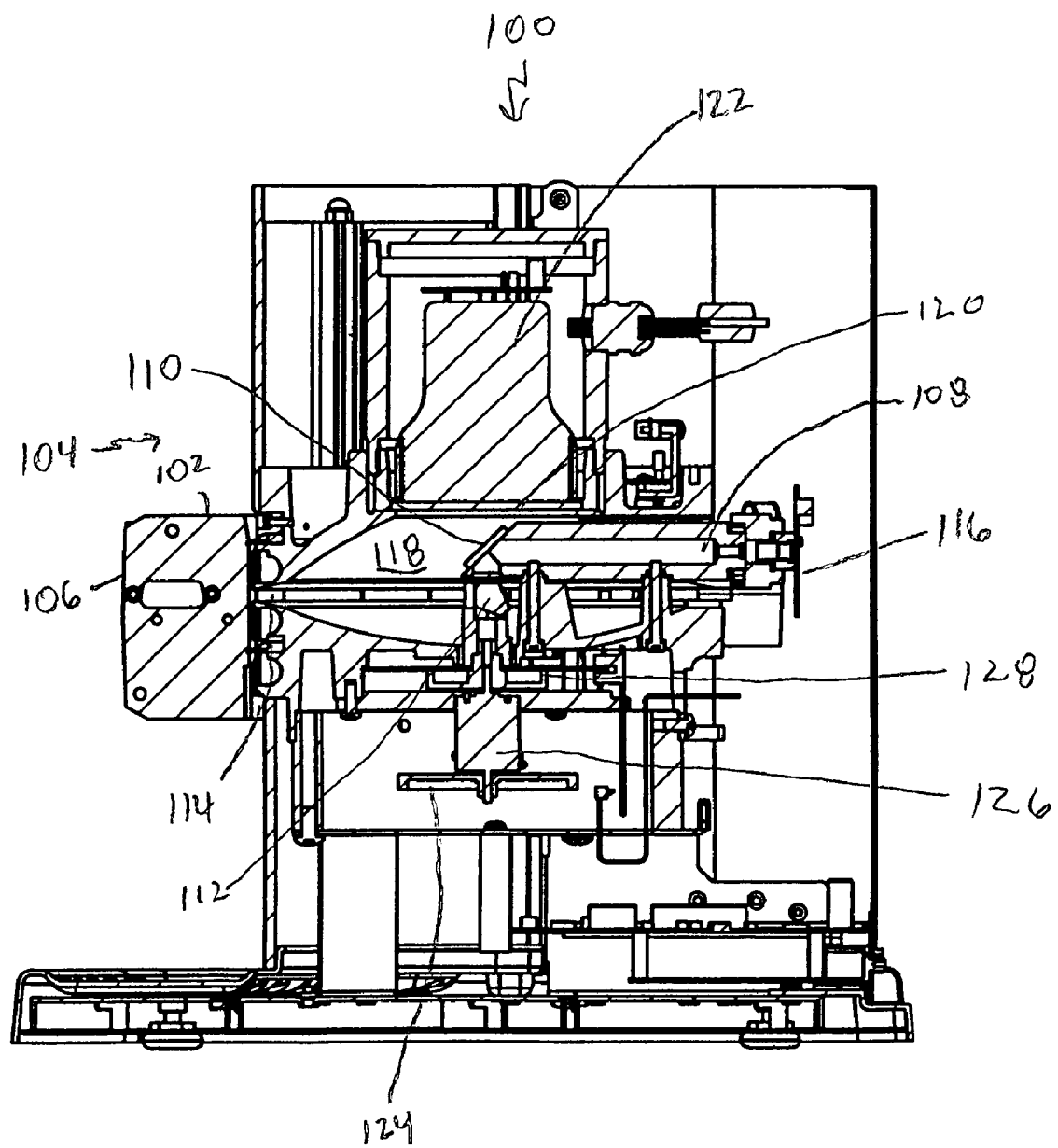
FIG. 3 is a cross sectional view of a current non-portable scanner.

In order to appreciate the enhancement obtained by the present invention, attention must be had to the prior art non-portable scanning devices, and the arrangement of the elements therein. This is illustrated in FIG. 3 which is a side cross section of a typical non-portable scanner 100. The typical prior art scanner 100 had four transport mechanisms 102 on the front 104 of the scanner for the transport of four different sized intra-oral imaging plates. These transport mechanisms were disposed about 180 degrees of the scanner 100 and were covered by a bulbous arch support and arch cover 106 of normally two piece construction.

The non-portable scanner 100 of the prior art has the laser tube 108 oriented in a horizontal position and utilized a 45 degree mirror 110 to change the path of the laser towards a pentaprism 112 before the pentaprism redirected the beam to the reading slot 114 where the storage plate would be interrogated by the laser beam. The laser printed circuit board, PCB 116 being behind the laser extended the overall dimensions of the scanner 100. The laser itself extended into an optical cavity 118 which was of greater size than the present invention since there were four transport assemblies 102 as opposed to two in the present invention. Still further, the laser tube 108 assembly of the prior art by extending into the optical cavity interfered with the blue filter 120 associated with the photomultiplier tube 122 thereby blocking a portion of the signal light. Additionally, a lower pentaprism fly wheel 124 and motor 126 were separate and distinct from an encoder 128. This contributed to the height of the current non-portable scanner. Applicant has rearranged these elements for the purpose of reducing the overall size and dimensions of the scanner to allow for portability and in the process has achieved some unexpected results with respect to the performance of the scanner and the clarity of the scanned image.

The reduction in width was accomplished by the following rearrangement of elements as illustrated in FIGS. 1 and 2 which illustrates a portable scanner 10. Using a 90 degree transport assembly segment with two belt tracks 12 centered on the unit instead of four, and simultaneously limiting the scanning slit width 14 to a subtended angle of 90 degrees as opposed to 180 degrees on larger non-portable scanners. An additional one inch or more of width reduction was accomplished by not having the need for bulbous transport covers 16 on the sides of the scanner due to the transport assembly spanning only 90 degrees is only in the front of the assembly as opposed to spanning 180 degrees in non-portable units with four transport mechanisms. These two factors result in a four inch width reduction with respect to the belt tracks 12 and a one inch reduction with respect to the transport covers 16 for a total reduction in width of 5 inches.

The reduction in height was accomplished by the following rearrangement of elements. The in feed 18 and out feed 20 height requirements were each reduced from 3 inches to 2¼ inches by requiring the not as frequently used size 4 imaging plates to be fed in oriented horizontally only as opposed to also vertically as allowed by larger scanning models. This resulted in a height reduction of 1.5 inches. By removing the restriction in the outer covers that limits the dental configuration to the dimensions cited, plates of any length having a scanner corresponding width of, say 6 inches or some other qualifying width dimension, can be scanned in such a portable device.

An additional three inches of height reduction is accomplished by relocating the main control printed circuit board, PCB 22 from horizontally to vertical. Close coupling of the photomultiplier tube (PMT) 24 and PCB 22 minimized the height of the PMT 24 enclosure and reduced the dome height of the PMT 24 reflector. This results in an additional three inches of height reduction.

The depth of the portable opto-electro-mechanical scanning assembly 10 of the present invention was reduced by the following rearrangement of elements. The laser tube 26 was reoriented from horizontal to vertical with a 45° pentaprism reflector casting 28. The laser tube 26 is integral with the pentaprism reflector 20 with the lens seats machined during the same set up as the remaining critically dimensioned features, such as the pentaprism assembly mounting surfaces. The PMT 24 blue filter 30 seat and bottom half of the PMT enclosure are integral to the PMT reflector with the cited features machined during the same set up as the remaining dimensioned features.

By orienting the laser tube 26 vertical and adjacent and parallel to the PMT 24, the laser tube 26 no longer obstructs a significant portion of the blue filter 30 inlet area, thereby admitting more signal light. Still further, the new optical cavity 32 is less than ⅛$^{th}$ the volume, and its center is located closer to the data imaging source thereby enhancing the signal detected. These changes resulted in a reduction of the depth of the opto-electro-mechanical scanner assembly 10 of the present invention by 4½ inches.

Due to these changes, certain enhanced results were achieved, those results being higher signal, higher signal to noise ratio; equal or better resolution, and by reorienting the laser tube 26, a 45 degree mirror 110 was eliminated from the cost of manufacture and with the converging or focusing lens remaining in the same relative location to the pentaprism, the laser tube 26 was shortened to further decrease the height. The shorter laser tube focuses correctly using both existing lenses. The longer length of the original laser tube was required by the need to have the laser centering and focusing mechanism outside of the optical cavity 32 which is smaller (about half the diameter and shallower, a height reduction in this new embodiment. The PMT 24 was moved forward to be between the laser tube 26 and the scanning slit 14 back up roller support structure. Further reduction in size was achieved by the relocation of the main PCB 22.

For certain markets, EMC is required. In order to achieve this, the major castings are designed to incorporate shielding elements that were previously add-on components. Additionally, these castings are designed to minimize tolerance build up by making elements that previously were separate parts integral to the castings. These latter changes result in less rejects, easier assembly and more precise optical alignments and improved imaging.

Other specific design improvements and consequences include the following:

1. Pentaprism reflector casting: The laser tube 26 is integral to the pentaprism reflector 28 with the lens seats machined during the same set up as the remaining critically dimensioned features, such as the pentaprism assembly mounting surfaces.

2. PMT reflector casting: The PMT blue filter 30 seat and bottom half of the PMT enclosure are integral to the PMT reflector 24 with the cited features machined during the same set up as the remaining critically dimensioned features.

3. Laser tube: By making the laser tube 26 vertical, adjacent, and parallel to the PMT 24, the laser tube 26 no longer obstructs a significant portion of the blue filter 30 inlet area thereby admitting more signal light.

4. New optical cavity: The new optical cavity 32 is less than about ⅛$^{th}$ the volume, and its center is located closer to the data imaging source thereby enhancing the signal detected.

5. Pentaprism motor and encoded: A built in encoder 40 is attached to the back end of the pentaprism motor 42, encoding more precisely directly off the motor shaft 44 as opposed to having a separate encoder wheel whose speed wheel is detected by a sensor mounted on a separate PC board.

The foregoing changes result in a portable, opto-electro-mechanical scanner unit with higher signal, higher signal to noise ratio (SNR), equal or better resolution, lower cost, the reduction of re-reflected laser caused noise and reduction of the scanning slots.

Many of the significant changes made to arrive at the portable, opto-electro-mechanical scanner assembly of the present invention may also have application in the larger scanning units which are typically centralized in a medical or dental operatory, or used in Veterinary, Non-destructive testing (NDT), and Explosive Ordnance Detection (EOD) applications. Those changes include, but are not limited to, the following:

The pentaprism reflector 28 casting with the laser tube 26 being integral to the pentaprism reflector 28 with the lens seats machined during the same set up as the remaining critically dimensioned features, such as the pentaprism assembly mounting surfaces.

The PMT 24 reflector casting would be integral with the PMT blue filter 30 seat and the bottom half of the PMT enclosure allowing them to be machined during the same set up as the remaining critically dimensioned features.

By making the laser tube 26 vertical, adjacent and parallel to the PMT 24, the laser tube 26 no longer obstructs a significant portion of the blue filter 30 inlet area, thereby admitting more signal light.

The new optical cavity 32 which is about one quarter of the volume less than its older model with the center located closer to the data imaging source will thereby enhance the signal detected.

By positioning a built in encoder 40 to the back end of the motor 42 permits encoding more precisely directly off the motor shaft 44 as opposed to having a separate encoder wheel whose speed wheel is detected by a sensor mounted on a separate PC board. By readjusting the scanning slit 14 height in the standardized scanning assemblies used in a centralized location, the re-reflective laser caused noise would be significantly reduced and enhance the quality of the image.

While the present invention has been described with respect to the exemplary embodiments thereof, it will be recognized by those of ordinary skill in the art that many modifications or changes can be achieved without departing from the spirit and scope of the invention. It is understood that orthogonal directions such as horizontal and vertical can be interchanged without loss of generality or specificity of the descriptions or claims.

Therefore it is manifestly intended that the invention be limited only by the scope of the claims and the equivalence thereof.

We claim:

1. A scanner assembly for the opto-electro-mechanical scanning of a photo-stimulable phosphor imaging plate, the image scanned being stored for review on a central processing unit, the scanner assembly comprising:
    a transport means for transporting an exposed photo-stimulable phosphor imaging plate past an interrogation slot;
    an optical cavity for containment of the luminescence generated by the interrogation of the photo-stimulable phosphor imaging plate, said optical cavity in communication with said interrogation slot, said optical cavity spans 90 degrees of said circumference of said scanner assembly in conjunction with said transport means;
    a photomultiplier tube with filter for the digital enhancement of said luminescence generated by said interrogation;
    a pentaprism for directing a light beam through said interrogation slot for an interrogation of said photo-stimulable phosphor imaging plate;
    a light source in the form of a laser and a laser tube for directing said laser to said pentaprism for directing said laser to said interrogation slot for interrogation of said photo-stimulable phosphor imaging plate, said laser and laser tube being oriented in a vertical orientation to said pentaprism; and
    a motor and encoder means for the rotation of said pentaprism.

2. The scanner assembly in accordance with claim 1 wherein said laser tube is positioned outside of said optical cavity.

3. The scanner assembly in accordance with claim 1 wherein said laser tube is positioned parallel and adjacent to said photomultiplier tube eliminating any obstruction to said photomultiplier tube and said filters.

4. The scanner assembly in accordance with claim 1 wherein said motor and said encoder are of unitary construction and mounted on a common shaft.

5. The scanner assembly in accordance with claim 1 wherein said laser tube and said pentaprisms are of integral construction.

6. A portable scanner assembly for the opto-electro-mechanical scanning of a photo-stimulable phosphor imaging plate, said portable scanner comprising:
    a transport means for transporting an exposed photo-stimulable phosphor imaging plate past an interrogation slot;
    an optical cavity for containment of the luminescence generated by the interrogation of the photo-stimulable phosphor imaging plate, said optical cavity in communication with said interrogation slot, said optical cavity spans 90 degrees of said circumference of said scanner assembly in conjunction with said transport means;
    a photomultiplier tube with filter for the digital enhancement of said luminescence generated by said interrogation;
    a pentaprism for directing a light beam through said interrogation slot for an interrogation of said photo-stimulable phosphor imaging plate;
    a light source in the form of a laser and a laser tube for directing said laser to said pentaprism for directing said laser to said interrogation slot for interrogation of said photo-stimulable phosphor imaging plate, said laser and laser tube being oriented in a vertical orientation to said pentaprism; and
    a motor and encoder means for the rotation of said pentaprism.

7. The scanner assembly in accordance with claim 6 wherein said laser tube is positioned outside of said optical cavity.

8. The scanner assembly in accordance with claim 6 wherein said laser tube is positioned parallel and adjacent to said photomultiplier tube eliminating any obstruction to said photomultiplier tube and said filters.

9. The scanner assembly in accordance with claim 6 wherein said motor and said encoder are of unitary construction and mounted on a common shaft.

10. The scanner assembly in accordance with claim 6 wherein said laser tube and said pentaprisms are integral construction.

11. The scanner assembly in accordance with claim 6 wherein said transport means comprises two transport mechanisms, said transport mechanisms spanning 90 degrees of the circumference of said scanner assembly.

* * * * *